J. Myers.
Vault Cover
Nº 2,534.
33,538.
Patented Oct. 22, 1861.
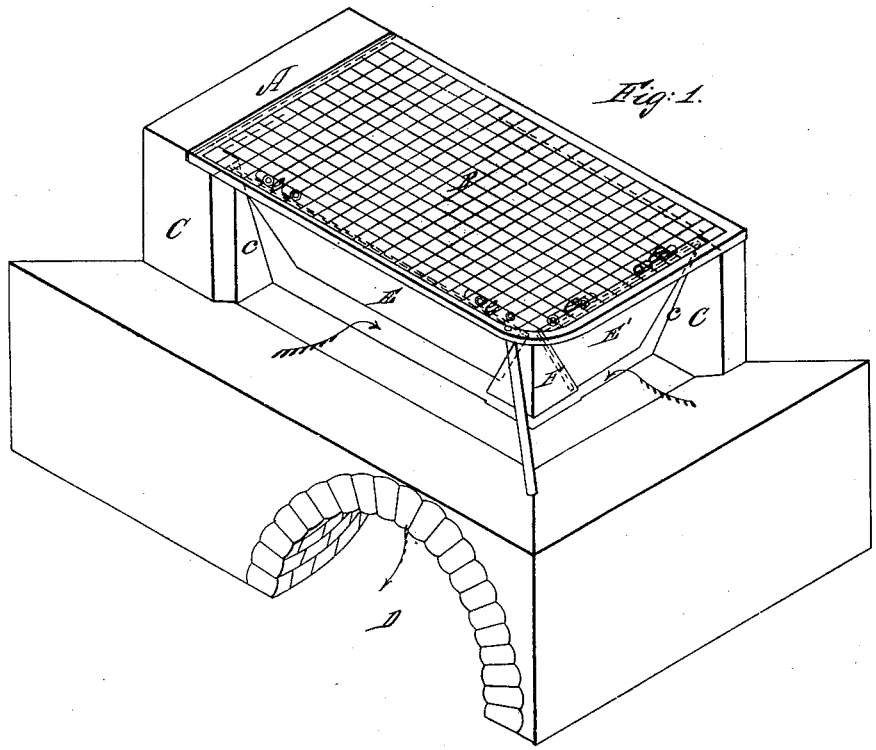
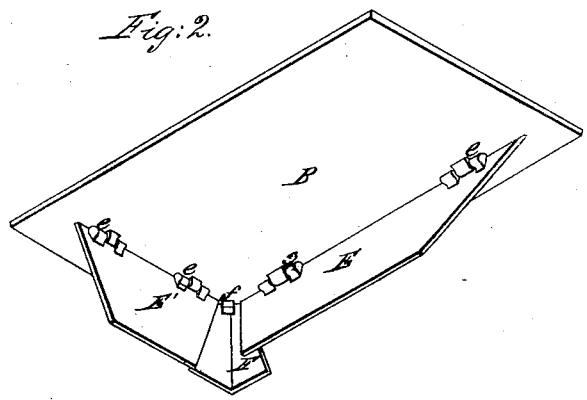
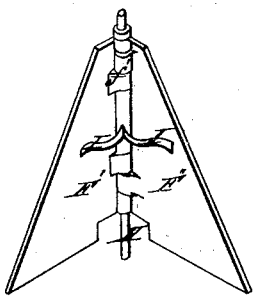
Witnesses:
Inventor:

UNITED STATES PATENT OFFICE.

JOHN MYERS AND GEORGE ELBREG, OF CINCINNATI, OHIO.

IMPROVEMENT IN STREET-SEWERS.

Specification forming part of Letters Patent No. 33,538, dated October 22, 1861.

*To all whom it may concern:*

Be it known that we, JOHN MYERS and GEORGE ELBREG, both of Cincinnati, Hamilton county, Ohio, have invented a new and useful Improvement in Street-Sewers; and we do hereby declare the following to be a full, clear, and exact description thereof, reference being had to the annexed drawings, making part of this specification.

Our invention relates to a system of self-closing "traps" or doors for the inlets of street-sewers, said traps being adapted to open either partially or altogether, according to the volume of the current, and when shut to confine the exhalations within the sewer, thus dispensing with the usual "wells" or "water-traps," which are nearly useless from their liability to fill up and their incapacity for closing the entire sewer.

Figure 1 is a perspective view of a sewer-inlet with our improvement. Fig. 2 is an under side view of the curb-plate. Fig. 3 is a modification of our "corner-piece."

A represents a portion of pavement near the inlet.

B is an iron curb-plate.

C are the walls of the shaft.

D is a culvert.

The inner walls $c$ of the shaft slope inwardly as they descend, so as to form inclined seats for doors E E' of the represented trapezoidal shape. These doors E E' are hinged at $e$ by their longest edge to the under side of the curb-plate B. Hinged at $f$ to the curb-plate B, between and slightly in rear of doors E and E', is a third door F, formed of two trapezoidal plates united at right angles. This door F, or corner-piece, serves to close the vacancy created by the peculiar shape of the doors E E' whenever the trap is shut, but yields in common with said doors to any unusual flood from the gutter. The trapezoidal form of the doors E E' allows them to swing inwardly to any extent without obstructing each other's movements, and each door E or E' is capable of swinging independently of the corner-piece or of the other, so that a stream entering one only is not required to lift the entire set of doors. It will further be seen that the entire trap, including the corner-piece, is capable of opening completely around from $c$ to $c$, so as to leave an ample, single, and unobstructed passage to any considerable flood.

Fig. 3 represents a corner-piece formed of two leaves F F', hinged to the corner-post H, and held to their seats by a spring I or by their weight alone.

We claim as new and of our invention—

The arrangement of doors E E', yielding corner-piece F', curb B, and inclined seats $c$, or equivalent devices, for the automatic closing of sewer-inlets without obstructing the passages thereof, in the manner set forth.

In testimony of which invention we hereunto set our hands.

JOHN MYERS.
GEORGE ELBREG.

Witnesses:
GEO. H. KNIGHT,
WM. EATON.